United States Patent
Wu

(10) Patent No.: US 8,896,253 B2
(45) Date of Patent: Nov. 25, 2014

(54) CONTROL CIRCUIT FOR FAN

(75) Inventor: Kang Wu, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 68 days.

(21) Appl. No.: 13/592,431

(22) Filed: Aug. 23, 2012

(65) Prior Publication Data

US 2014/0042947 A1 Feb. 13, 2014

(30) Foreign Application Priority Data

Aug. 7, 2012 (CN) .......................... 2012 1 02784230

(51) Int. Cl.
*H02P 27/00* (2006.01)
*H02P 7/00* (2006.01)
*H02P 6/00* (2006.01)
*H02P 7/29* (2006.01)

(52) U.S. Cl.
USPC ...... 318/500; 318/447; 318/472; 318/400.29; 388/829

(58) Field of Classification Search
USPC ............. 318/447, 472, 400.29, 500; 388/829
See application file for complete search history.

(56) References Cited

U.S. PATENT DOCUMENTS

| | | | |
|---|---|---|---|
| 7,141,950 B1* | 11/2006 | Verge | 318/400.29 |
| 2002/0093250 A1* | 7/2002 | Yu | 307/117 |
| 2007/0253685 A1* | 11/2007 | Dhuey | 388/829 |
| 2008/0240688 A1* | 10/2008 | Alberkrack et al. | 388/811 |
| 2009/0096402 A1* | 4/2009 | Miyajima et al. | 318/473 |
| 2011/0089878 A1* | 4/2011 | Mishima | 318/447 |

* cited by examiner

*Primary Examiner* — Eduardo Colon Santana
*Assistant Examiner* — Gabriel Agared
(74) *Attorney, Agent, or Firm* — Novak Druce Connolly Bove + Quigg LLP

(57) ABSTRACT

A control circuit for a fan includes a fan controller, a switch controller, and a frequency detector. When a pulse-width modulation (PWM) signal output pin of the fan controller outputs PWM signals, the frequency detector outputs a high level signal, connecting an input pin of the switch controller to an output pin of the switch controller. The fan receives the PWM signal. When the PWM signal output pin of the fan controller does not output PWM signals, the frequency detector outputs a low level signal, such that the output pin of the switch controller does not output any signal. In this state, the fan receives a high level signal through a resistor and a power supply, enabling the fan to continue operating.

2 Claims, 1 Drawing Sheet

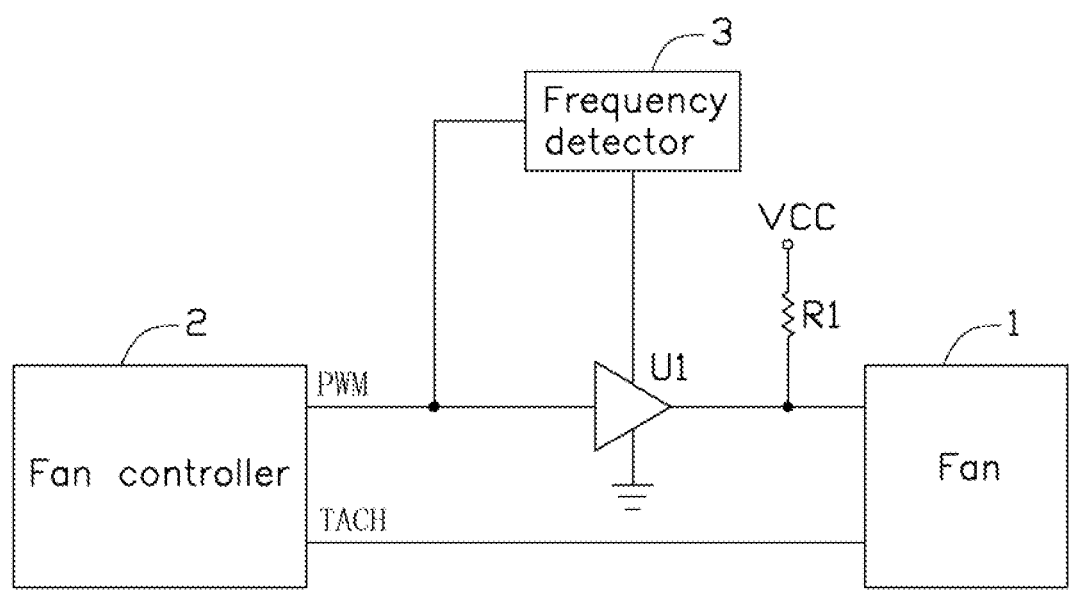

CONTROL CIRCUIT FOR FAN

BACKGROUND

1. Technical Field

The present disclosure relates to a circuit for controlling a fan.

2. Description of Related Art

Fans in computers may be controlled by a fan controller. The fan controller outputs a pulse-width modulation (PWM) signal to control fan speed. In addition, the fan controller measures the speed of the fan to determine whether the fan is operating. However, if the fan controller malfunctions and stops operating, then no PWM signals are output, and the fan will not operate.

BRIEF DESCRIPTION OF THE DRAWING

Many aspects of the embodiments can be better understood with reference to the following drawing. The components in the drawing are not necessarily drawn to scale, the emphasis instead being placed upon clearly illustrating the principles of the present embodiments. Moreover, in the drawing, like reference numerals designate corresponding parts throughout the view.

The FIGURE is a circuit diagram of an exemplary embodiment of a control circuit.

DETAILED DESCRIPTION

The disclosure, including the accompanying drawing, is illustrated by way of examples and not by way of limitation. It should be noted that references to "an" or "one" embodiment in this disclosure are not necessarily to the same embodiment, and such references mean at least one.

Referring to the FIGURE, an exemplary embodiment of a control circuit is used for controlling a fan 1. The control circuit includes a fan controller 2, a frequency detector 3, a three state gate U1, a resistor R1, and a power supply VCC.

The fan controller 2 includes a pulse-width modulation (PWM) signal output pin PWM and a speed measuring pin TACH. The PWM signal output pin PWM outputs a PWM signal to control the fan 1. The speed measuring pin TACH receives a speed signal from the fan 1 indicating the speed of the fan 1.

The PWM signal output pin PWM of the fan controller 2 is connected to an input pin of the three state gate U1 and the frequency detector 3. An output pin of the three state gate U1 is connected to the fan 1. A node between the output pin of the three state gate U1 and the fan 1 is connected to the power supply VCC through the resistor R1. An enable pin of the three state U1 is connected to the frequency detector 3. The speed measuring pin TACH of the fan controller 2 is connected to the fan 1 to measure the speed of the fan 1.

When the fan controller 2 is operating, the fan controller 2 outputs a PWM signal. The PWM signal is output to the frequency detector 3 and the three state gate U1. The frequency detector 3 obtains a frequency of the received PWM signal. The frequency is not equal to zero. As a result, the frequency detector 3 outputs a high level signal to the enable pin of the three state gate U1, which turns on the three state gate U1. The output pin of the three state gate U1 outputs the PWM signal to the fan 1 to control the fan 1.

When the fan controller 2 is not operating, the fan controller 2 does not output a PWM signal. The frequency detector 3 cannot obtain frequency of a PWM signal. As a result, the frequency detector 3 outputs a low level signal to the enable pin of the three state gate U1, turning off the three state gate U1. The output pin of the three state gate U1 does not output signals. In this condition, because of the resistor R1 and the power supply VCC, the fan 1 receives a high level signal, which correspond to a PWM signal with a duty cycle of "1", activating the fan 1 to operate at full speed. As a result, even if the fan controller 2 is not operating, the fan 1 remains operating.

In other embodiments, the three state gate U1 can be other switch controllers. The switch controller includes an input pin, an output pin, and a control pin. The input pin of the switch controller corresponds to the input pin of the three state gate U1. The output pin of the switch controller corresponds to the output pin of the three state gate U1. The control pin of the switch controller corresponds to the enable pin of the three state gate U1. When the input pin of the switch controller receives a high level signal, the output pin is connected to the input pin of the switch controller. When the input pin of the switch controller receives a low level signal, the output pin of the switch controller does not output signals.

The foregoing description of the exemplary embodiments of the disclosure has been presented only for the purposes of illustration and description and is not intended to be exhaustive or to limit the disclosure to the precise forms disclosed. Many modifications and variations are possible in the light of everything above. The embodiments were chosen and described in order to explain the principles of the disclosure and their practical application so as to enable others of ordinary skill in the art to utilize the disclosure and various embodiments with various modifications as are suited to the particular use contemplated. Alternative embodiments will become apparent to those of ordinary skills in the art to which the present disclosure pertains without departing from its spirit and scope. Accordingly, the scope of the present disclosure is defined by the appended claims rather than the foregoing description and the exemplary embodiments described therein.

What is claimed is:

1. A control circuit for controlling a fan, the control circuit comprising:

a fan controller comprising a speed measuring pin and a pulse-width modulation (PWM) signal output pin, wherein the speed measuring pin is connected to the fan to receive speed signals from the fan for indicating a speed of the fan;

a switch controller comprising an input pin connected to the PWM signal output pin of the fan controller to receive PWM signals from the PWM signal output pin of the fan controller, and an output pin connected to the fan;

a resistor comprising a first end connected to a node between the output pin of the switch controller and the fan, and a second end;

a power supply connected to the second end of the resistor; and a frequency detector connected to the PWM signal output pin of the fan controller and a control pin of the switch controller; wherein when the PWM signal output pin of the fan controller outputs PWM signals, the frequency detector outputs a high level signal, such that the input pin of the switch controller is connected to the output pin of the switch controller, to output the PWM signal to the fan to control the fan; wherein when the PWM signal output pin of the fan controller does not output PWM signals, the frequency detector outputs a low level signal, such that the output pin of the switch controller does not output any signal, the fan receives a high level signal from the power supply through the resistor, to activate the fan to operate at full speed.

2. The control circuit of claim 1, wherein the switch controller comprises a three state gate, the input pin of the switch controller is an input pin of the three state gate, the output pin of the switch controller is an output pin of the three state gate, and the control pin of the switch controller is an enable pin of the three state gate.

* * * * *